US012800884B2

(12) United States Patent
Lim et al.

(10) Patent No.: US 12,800,884 B2
(45) Date of Patent: Nov. 17, 2026

(54) IMAGING LENS SYSTEM

(71) Applicant: SAMSUNG ELECTRO-MECHANICS CO., LTD., Suwon-si (KR)

(72) Inventors: Tae Yeon Lim, Suwon-si (KR); Byung Hyun Kim, Suwon-si (KR); Gil Hun Lee, Suwon-si (KR); Young Suk Kang, Suwon-si (KR); Yong Joo Jo, Suwon-si (KR); Young Su Jin, Suwon-si (KR); Han Na Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 213 days.

(21) Appl. No.: 18/623,479

(22) Filed: Apr. 1, 2024

(65) Prior Publication Data

US 2025/0076618 A1 Mar. 6, 2025

(30) Foreign Application Priority Data

Aug. 29, 2023 (KR) ........................ 10-2023-0113700
Dec. 21, 2023 (KR) ........................ 10-2023-0188666

(51) Int. Cl.

| | |
|---|---|
| ***G02B 13/00*** | (2006.01) |
| ***G02B 3/00*** | (2006.01) |
| ***G03B 17/17*** | (2021.01) |

(52) U.S. Cl.
CPC ....... *G02B 13/0065* (2013.01); *G02B 3/0062* (2013.01); *G02B 13/0045* (2013.01); *G03B 17/17* (2013.01)

(58) Field of Classification Search
CPC .............. G02B 13/0065; G02B 3/0062; G02B 13/0045; G02B 9/64; G03B 17/17
See application file for complete search history.

(56) References Cited

U.S. PATENT DOCUMENTS

2004/0201902 A1 10/2004 Mihara et al.
2007/0091200 A1 4/2007 Yamaguchi et al.
2010/0076268 A1* 3/2010 Takasugi ............ A61B 1/00183 600/171
2015/0253543 A1* 9/2015 Mercado ................ G02B 13/02 348/370
2015/0253647 A1* 9/2015 Mercado .............. G02B 13/007 359/708
2021/0096325 A1* 4/2021 Wu .................... G02B 13/0045

FOREIGN PATENT DOCUMENTS

JP 2007-114447 A 5/2007
WO WO 2018/180269 A1 4/2018

* cited by examiner

*Primary Examiner* — Charles S Chang
(74) *Attorney, Agent, or Firm* — NSIP Law

(57) ABSTRACT

An imaging lens system includes a first lens group, an optical path conversion element, and a second lens group arranged in order from an object side. An optical axis of the second lens group is disposed eccentrically in a direction with respect to a geometric optical axis of the optical path conversion element.

20 Claims, 10 Drawing Sheets

IMAGING LENS SYSTEM

CROSS-REFERENCE TO RELATED APPLICATIONS

This application claims the benefit under 35 USC 119 (a) of Korean Patent Application Nos. 10-2023-0113700 filed on Aug. 29, 2023, and 10-2023-0188666 filed on Dec. 21, 2023, in the Korean Intellectual Property Office, the entire disclosures of which are incorporated herein by reference for all purposes.

BACKGROUND

1. Field

The present disclosure relates to an imaging lens system having an optical path conversion element.

2. Description of the Background

A portable electronic device may include a camera module for capturing a still image or a moving video image. The camera module may be mounted on a portable phone, a notebook computer, a game console, or the like. A portable electronic device is generally manufactured in a thin or small size to enhance user convenience. For example, the camera module mounted in the portable electronic device may be configured to have an imaging lens system in a form including an optical path conversion element. The optical path conversion element may separate an optical path of an imaging lens system elongated in one direction in two or more directions, thereby enabling thinning and miniaturization of a camera module. However, an optical path conversion element such as a prism may cause a flare phenomenon due to internal reflection, thereby deteriorating resolution of an imaging lens system and a camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens group, an optical path conversion element, and a second lens group arranged in order from an object side. An optical axis of a second lens group is disposed eccentrically in a direction with respect to a geometric optical axis of an optical path conversion element.

An optical axis of the first lens group may be disposed eccentrically in a direction with respect to the geometric optical axis of the optical path conversion element.

The first lens group may include a plurality of lenses.

In the first lens group, a front lens disposed closest to the optical path conversion element may have positive refractive power.

In the first lens group, a forwardmost lens disposed closest to an object may have a convex object-side surface.

The second lens group may include a plurality of lenses.

In the second lens group, a rear lens disposed closest to the optical path conversion element may have positive refractive power.

In the second lens group, a rearmost lens disposed closest to an imaging plane may have positive refractive power or a convex image-side surface.

DPF/DPR may be greater than 1, where DPF is a distance of an optical path extending along a first optical axis of the first lens group from an object-side surface of the optical path conversion element to a reflective surface of the optical path conversion element, and DPR is a distance of an optical path extending along a second optical axis of the second lens group from the reflective surface of the optical path conversion element to an image-side surface of the optical path conversion element.

In another general aspect, an imaging lens system includes a first lens group, an optical path conversion element, and a second lens group arranged in order from an object side, wherein $0.060<(PB2-PB1)/LB1<0.20$, where PB1 is a shortest distance from a point in which an optical axis of the second lens group meets an exit surface of the optical path conversion element to one side of the exit surface, PB2 is a shortest distance from the point in which the optical axis of the second lens group meets the exit surface of the optical path conversion element to the other side of the exit surface, and LB1 is an effective radius of an object-side surface of a rear lens disposed closest to the exit surface in the second lens group.

Where f is a focal length of the imaging lens system, and ImgH is a height of an imaging plane, f/ImgH may be greater than 2.0 and less than 3.60.

In another general aspect, an imaging lens system includes a first lens group, an optical path conversion element, and a second lens group arranged in order from an object side, wherein an optical axis of the second lens group intersects an optical axis of the first lens group on a reflective surface of the optical path conversion element spaced apart from a center of the reflective surface.

The center may be a geometric optical axis of the optical path conversion element.

The optical axis of the second lens group may intersect the optical axis of the first lens group closer to the first lens group than the center is to the first lens group.

The optical axis of the second lens group may intersect the optical axis of the first lens group further away from the first lens group than the center is from the first lens group.

Other features and aspects will be apparent from the following detailed description, the drawings, and the claims.

Figure 1:
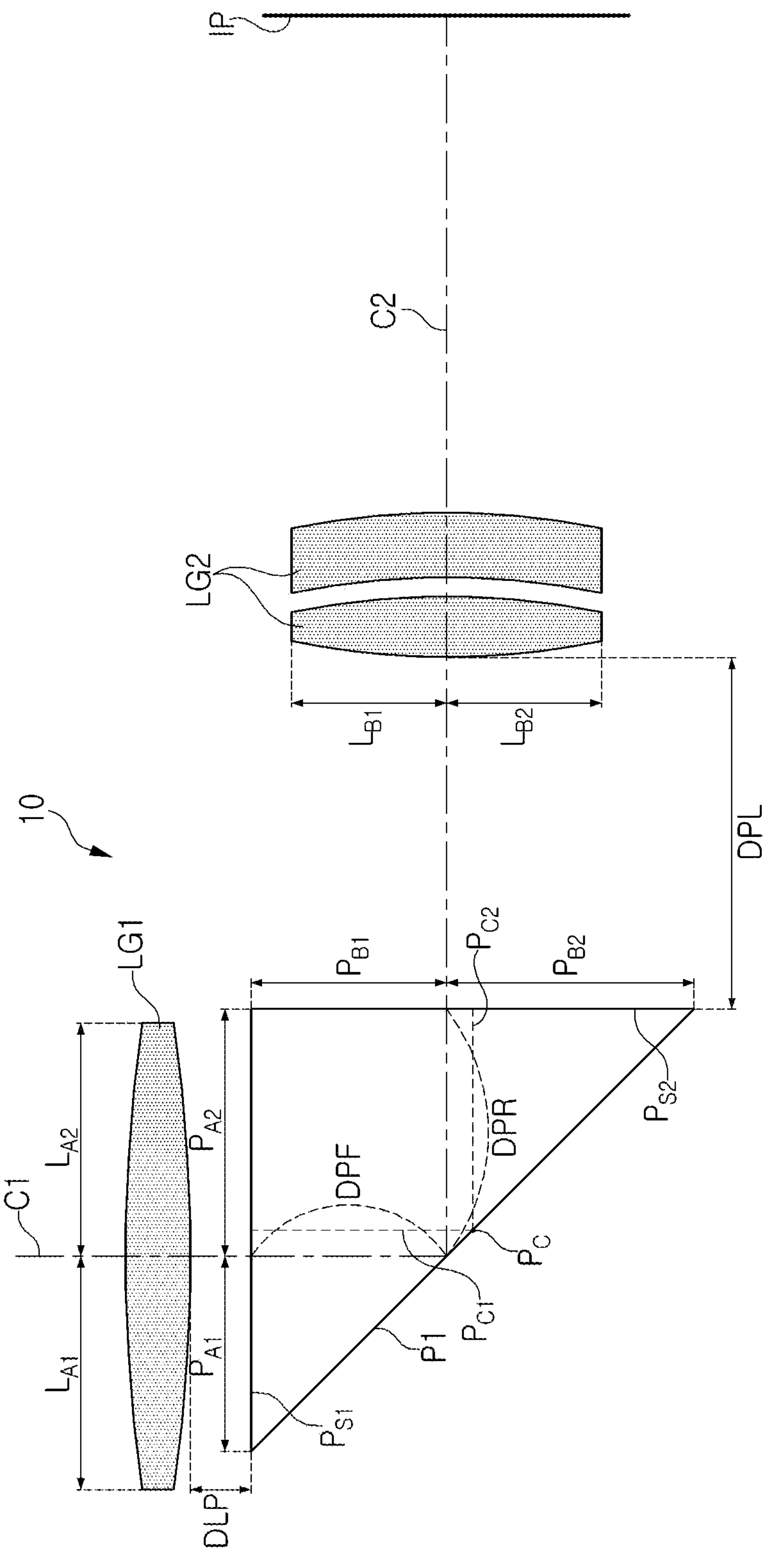
FIG. 1 is a block diagram of a first example of an imaging lens system according to one or more embodiments of the present disclosure.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

In describing example embodiments of the present disclosure, since terms referring to the components of the present disclosure are named in consideration of the functions of each component, the terms should not be understood as meaning limiting the technical components of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

The present disclosure may solve the above-described problems, although the present disclosure is not limited thereto. An object of the present disclosure is to provide an imaging lens system configured to reduce a flare phenomenon caused by an optical path conversion element.

In this specification, a forwardmost lens or a first lens refers to a lens closest to an object (or a subject), and a rearmost lens refers to a lens closest to an imaging plane (or an image sensor). In this specification, the units of curvature radius of a lens, a thickness, TTL (a distance from an object-side surface of the first lens to the imaging plane), ImgHT (or Y: a height of the imaging plane), and a focal length are mm (millimeters).

A thickness of the lens, a distance between lenses, and TTL are distances on an optical axis of the lens(es). In addition, in the description of the shape of the lens, a convex shape on one surface denotes that a paraxial region of that side is convex, and a concave shape on one surface denotes that the paraxial portion of that side is concave. Therefore, even if one surface of the lens is described as having a convex shape, an edge portion of the lens may be concave. Likewise, even if one surface of the lens is described as having a concave shape, an edge portion of the lens may be convex.

A paraxial region of a lens surface is a central portion of the lens surface surrounding and including the optical axis of the lens surface in which light rays incident to the lens surface make a small angle θ to the optical axis, and the approximations sin θ≈θ, tan θ ≈θ, and cos θ≈1 are valid.

An imaging lens system according to a first embodiment of the present disclosure may include a first lens group, an optical path conversion element, and a second lens group arranged in order from an object side. However, the number of lens groups constituting the imaging lens system according to the first embodiment is not limited to two. For example, the imaging lens system according to the first embodiment may further include a third lens group disposed on an image side of the second lens group. In the imaging lens system according to the first embodiment, the optical path conversion element and the second lens group may form a unique arrangement relationship. For example, in the imaging lens system according to the first embodiment, an optical axis of the second lens group may be eccentrically disposed with respect to a geometric optical axis of the optical path conversion element. For reference, the geometric optical axis of the optical path conversion element may be determined based on a reflective surface. For example, the geometric optical axis of the optical path conversion element may be a normal line connecting an incident surface and an exit surface of the optical path conversion element from the center of the reflective surface (a point in which different diagonals of the reflective surface intersect).

The imaging lens system according to the first embodiment may optionally further include one or more of the following features.

As one example, in the imaging lens system according to the first embodiment, the optical axis of the first lens group may be eccentrically disposed with respect to the geometric optical axis of the optical path conversion element.

As another example, in the imaging lens system according to the first embodiment, the first lens group may include a plurality of lenses. As a specific example, the first lens group may include three or more lenses.

As another example, in the imaging lens system according to the first embodiment, the first lens group may include a lens having positive refractive power. As a specific example, a front lens disposed closest to the optical path conversion element in the first lens group may have positive refractive power.

As another example, in the imaging lens system according to the first embodiment, the first lens group may include a lens having a convex object-side surface. As a specific example, a forwardmost lens disposed closest to an object in the first lens group may have a convex object-side surface.

As another example, in the imaging lens system according to the first embodiment, the second lens group may include a plurality of lenses. As a specific example, the second lens group may include two or more lenses.

As another example, in the imaging lens system according to the first embodiment, the second lens group may include a lens having positive refractive power. As a specific example, a rear lens disposed closest to the optical path conversion element in the second lens group may have positive refractive power.

As another example, in the imaging lens system according to the first embodiment, the second lens group may include a lens having positive refractive power or having a convex image-side surface. As a specific example, a rearmost lens disposed closest to an imaging plane in the second lens group may have positive refractive power or may have a convex image-side surface.

An imaging lens system according to the second embodiment of the present disclosure may include a first lens group, an optical path conversion element, and a second lens group arranged in order from an object side. However, the number of lens groups constituting the imaging lens system according to the second embodiment is not limited to two. For example, the imaging lens system according to the second embodiment may further include a third lens group disposed on an image side of the second lens group. The imaging lens system according to the second embodiment may satisfy a unique conditional expression. For example, the imaging lens system according to the second embodiment may satisfy the conditional expression, that is, $0.060<(PB2-PB1)/LB1<0.20$. In the conditional expression, PB1 is the shortest distance from a point in which an optical axis of the second lens group meets an exit surface of the optical path conversion element to one side of the exit surface, PB2 is the longest distance from a point in which an optical axis of the second lens group meets an exit surface of the optical path conversion element to the other side of the exit surface, and LB1 is an effective radius of an object-side surface of a rear lens disposed closest to the exit surface in the second lens group.

An imaging lens system according to the second embodiment may optionally further include one or more of the following features.

For example, in the imaging lens system according to the second embodiment, an optical axis of a first lens group may be eccentrically disposed with respect to a geometric optical axis of an optical path conversion element.

As another example, in the imaging lens system according to the second embodiment, the first lens group may include a plurality of lenses. As a specific example, the first lens group may include three or more lenses.

As another example, in the imaging lens system according to the second embodiment, the first lens group may include a lens having positive refractive power. As a specific example, a front lens disposed closest to the optical path conversion element in the first lens group may have positive refractive power.

As another example, in the imaging lens system according to the second embodiment, the first lens group may include a lens having a convex object-side surface. As a specific example, a forwardmost lens disposed closest to an object in the first lens group may have a convex object-side surface.

As another example, in the imaging lens system according to the second embodiment, the second lens group may include a plurality of lenses. As a specific example, the second lens group may include two or more lenses.

As another example, in the imaging lens system according to the second embodiment, the second lens group may include a lens having positive refractive power. As a specific example, a rear lens disposed closest to the optical path conversion element in the second lens group may have positive refractive power.

As another example, in the imaging lens system according to the second embodiment, the second lens group may include a lens having positive refractive power or having a convex image-side surface. As a specific example, a rearmost lens disposed closest to an imaging plane in the second lens group may have positive refractive power or may have a convex image-side surface.

An imaging lens system according to a third embodiment of the present disclosure includes a first lens group, an optical path conversion element, and a second lens group arranged in order from an object side, and may satisfy one or more of the following conditional expressions.

$$1.0 < DPR/DPF \quad 1)$$

$$0.95 < LA1/LA2 < 1.05 \quad 2)$$

$$0.95 < LB1/LB2 < 1.05 \quad 3)$$

$$0.80 < PA1/PA2 < 1.0 \quad 4)$$

$$0.80 < PB1/PB2 < 1.0 \quad 5)$$

$$0.10 < DLP \quad 6)$$

$$0.50 < DPL \quad 7)$$

$$0.50 < (DLP + DPF)/(DPL + DPR) < 1.0 \quad 8)$$

$$2.0 < fG1/DLPL \quad 9)$$

In the conditional expressions, DPF is a distance from an incident surface of the optical path conversion element to a reflective surface of the optical path conversion element calculated based on a first optical axis of the first lens group, DPR is a distance from a reflective surface of the optical path conversion element to an exit surface of the optical path conversion element calculated based on a second optical axis of the second lens group, LA1 is an effective radius in one side direction (a direction farthest from the second lens group) of a forwardmost lens disposed closest to an object in the first lens group, LA2 is an effective radius in the other side direction (a direction closest to the second lens group) of the forwardmost lens, LB1 is an effective radius in one side direction (a direction closest to the first lens group) of a rear lens disposed closest to the optical path conversion element in the second lens group, LB2 is an effective radius in the other side direction (a direction furthest from the first lens group) of the rear lens, PA1 is the shortest distance from a point in which an incident surface of the optical path conversion element meets the first optical axis to the farthest point from the second lens group, PA2 is the shortest distance from a point in which the incident surface of the optical path conversion element meets the first optical axis to a point closest to the second lens group, PB1 is the shortest distance from a point in which the exit surface of the optical path conversion element meets the second optical axis to a point closest to the first lens group, PB2 is the shortest distance from a point in which the exit surface of the optical path conversion element meets the second optical axis to a point farthest from the first lens group, DLP is a distance from an image-side surface of a front lens closest to the optical path conversion element in the first lens group to the incident surface of the optical path conversion element, DPL is a distance from the exit surface of the optical path conversion element to an object-side surface of the rear lens, fG1 is a focal length of the first lens group, and DLPL is a distance (based on the first and second optical axes) from the image-side surface of the front lens to the object-side surface of the rear lens.

Conditional expression 1 may be a condition for forming a long optical path length of light that is totally reflected through the optical path conversion element. For example, an imaging lens system that does not satisfy Conditional Expression 1 may have difficulty implementing a telephoto optical system or an optical system with a long focal length. Furthermore, an imaging lens system that does not satisfy Conditional Expression 1 is likely to cause a flare phenomenon by the optical path conversion element is likely to occur.

Conditional expressions 2 and 3 may be conditions for limiting the shape, brightness, and peripheral light ratio of a lens group. For example, a lens group or lens that does not satisfy Conditional Expressions 2 and 3 may have an asymmetric shape that is biased to one side relative to the optical axis, which may make it difficult to implement a bright imaging lens system and may worsen the peripheral light ratio of the imaging lens system.

Conditional expressions 4 and 5 may be conditions for reducing the flare phenomenon caused by the optical path conversion element. For example, an optical path conversion element that does not satisfy Conditional Expressions 4 and 5 is likely to cause a flare phenomenon in a process of total reflection of light incident on the optical path conversion element.

Conditional expressions 6, 7, and 9 may be conditions for implementing a telephoto optical system and a compact optical system. For example, an imaging lens system that does not satisfy Conditional Expressions 6, 7, and 9 may not only have difficulty implementing telephoto characteristics but also may be difficult to mount in a small electronic device (e.g., a portable terminal). Additionally, an imaging lens system that does not satisfy Conditional Expressions 6, 7, and 9 may have difficulty implementing a low f number.

Conditional Expression 8 may be a condition for implementing a compact optical system and a high-resolution optical system. For example, an imaging lens system that does not satisfy Conditional Expression 8 may be difficult to mount in a small electronic device. Additionally, an imaging lens system that does not satisfy Conditional Expression 8 is likely to cause a flare phenomenon by the optical path conversion element.

Conditional Expression 9 may be a condition for implementing a high-resolution optical system. For example, in an imaging lens system that does not satisfy Conditional Expression 9, it may be difficult to form a clear image on an imaging plane because the focal length of the first lens group is smaller than an air gap between the first lens group and the second lens group.

An imaging lens system according to a fourth embodiment includes a first lens group, an optical path conversion element, and a second lens group arranged in order from an object side, and may satisfy one or more of the following conditional expressions.

$$1.20 < fG1/f < 3.20 \quad 10)$$

$$1.0 < fG2/f < 2.0 \quad 11)$$

$$0.020 < fG1/fG2 < 12.0 \quad 12)$$

$$1.20 < fG1/DPIP < 2.60 \quad 13)$$

$$0.80 < fG2/DPIP < 2.0 \quad 14)$$

$$2.0 < f/ImgH < 3.60 \quad 15)$$

$$1.0 < TTL/f < 1.60 \quad 16)$$

$$1.0 < LA1/PA1 < 1.80 \quad 17)$$

$$0.80 < LA2/PA2 < 1.60 \quad 18)$$

$$0.60 < LB1/PB1 < 1.20 \quad 19)$$

-continued $$0.60 < LB2/PB2 < 1.0 \quad 20)$$

$$0.020 < (PA1 - PA2)/LA1 < 0.080 \quad 21)$$

$$0.060 < (PB1 - PB2)/LB1 < 0.20 \quad 22)$$

In the conditional expressions, f is a focal length of the imaging lens system, fG2 is a focal length of the second lens group, ImgH is a height of an imaging plane, DPIP is a distance (based on a second optical axis) from a reflective surface of the optical path conversion element to the imaging plane, and TTL is a distance (based on first and second optical axes) from an object-side surface of a forwardmost lens to the imaging plane.

Conditional Expressions 10 to 12 may be conditions for limiting refractive power of the first lens group and the second lens group to achieve a high-resolution imaging lens system. For example, an imaging lens system that does not satisfy all of Conditional Expressions 10 to 12 may have difficulty implementing high resolution. For example, in order to achieve a high-resolution imaging lens system, two or more of Conditional Expressions 10 to 12 may be satisfied. As another example, in order to achieve a high-resolution imaging lens system, all of Conditional Expressions 10 to 12 may be satisfied.

Conditional expressions 13 and 14 may be conditions for limiting refractive power of the first lens group and the second lens group to achieve a high-resolution imaging lens system. For example, an imaging lens system that does not satisfy both Conditions Expressions 13 and 14 may have difficulty realizing high resolution.

Conditional expression 15 may be a condition for implementing a small telephoto optical system. For example, an imaging lens system that does not satisfy Conditional Expression 15 may be difficult to mount in a portable terminal because it is difficult to implement a telephoto optical system including an optical path conversion element.

Conditional Expression 16 may be a condition for implementing a small optical system. For example, an imaging lens system that does not satisfy Conditional Expression 16 may be difficult to install in a portable terminal.

Conditional expressions 17 to 22 may be conditions for reducing a flare phenomenon caused by the optical path conversion element. For example, an imaging lens system that does not satisfy Conditional Expressions 17 to 22 may have difficulty reducing the flare phenomenon caused by the optical path conversion element.

The imaging lens system according to the present disclosure may include one or more lenses having the following characteristics as needed. As an example, the imaging lens system according to the first embodiment may include one of the first to sixth lenses according to the following characteristics. As another example, the imaging lens system according to the second to fourth embodiments may include one or more of the first to sixth lenses according to the following characteristics. However, the imaging lens system according to the above-described form does not necessarily include a lens according to the following characteristics. Hereinafter, the characteristics of the first to sixth lenses will be described.

A first lens has refractive power. For example, the first lens may have positive or negative refractive power. The first lens may have a convex shape on one side surface thereof. For example, the first lens may have a convex object-side surface. The first lens includes a spherical or aspherical surface. For example, both surfaces of the first lens may be aspherical. The first lens may be formed of a material with high light transmittance and excellent processability. For example, the first lens may be formed of plastic or glass. The first lens may be configured to have a predetermined refractive index. For example, the refractive index of the first lens may be greater than 1.5. As a specific example, the refractive index of the first lens may be greater than 1.50 and less than 1.60. The first lens may have a predetermined Abbe number. For example, the Abbe number of the first lens may be 50 or more.

A second lens has refractive power. For example, the second lens may have positive or negative refractive power. The second lens has a convex shape on one surface thereof. For example, the second lens may have a convex image-side surface. The second lens may be formed of a material with high light transmittance and excellent processability. For example, the second lens may be formed of plastic or glass. The second lens may be configured to have a predetermined refractive index. For example, the refractive index of the second lens may be greater than 1.5. The second lens may have a predetermined Abbe number. For example, the Abbe number of the second lens may be 20 or more.

A third lens has refractive power. For example, the third lens may have positive or negative refractive power. The third lens has a concave shape on one surface thereof. As an example, the third lens may have a concave object-side surface. The third lens includes a spherical or aspherical surface. For example, both surfaces of the third lens may be aspherical. The third lens may be formed of a material with high light transmittance and excellent processability. For example, the third lens may be formed of plastic material. The third lens may be configured to have a predetermined refractive index. For example, the refractive index of the third lens may be greater than 1.5. The third lens may have a predetermined Abbe number. For example, the Abbe number of the third lens may be greater than 20.

A fourth lens has refractive power. For example, the fourth lens may have positive or negative refractive power. The fourth lens has a concave shape on one surface thereof. As an example, the fourth lens may have a concave object-side surface. As another example, the fourth lens may have a concave image-side surface. The fourth lens includes a spherical or aspherical surface. For example, both surfaces of the fourth lens may be aspherical. The fourth lens may be formed of a material with high light transmittance and excellent processability. For example, the fourth lens may be formed of plastic material. The fourth lens may have a predetermined refractive index. For example, the refractive index of the fourth lens may be greater than 1.5. The fourth lens may have a predetermined Abbe number. For example, the Abbe number of the fourth lens may be 20 or more.

A fifth lens has refractive power. For example, the fifth lens may have negative refractive power. The fifth lens has a convex shape on one surface thereof. As an example, the fifth lens may have a convex object-side surface. The fifth lens includes a spherical or aspherical surface. For example, both surfaces of the fifth lens may be aspherical. The fifth lens may be formed of a material with high light transmittance and excellent processability. For example, the fifth lens may be formed of plastic material. The fifth lens may have a predetermined refractive index. As an example, the refractive index of the fifth lens may be greater than 1.6. The fifth lens may have a predetermined Abbe number. For example, the Abbe number of the fifth lens may be greater than 20.

A sixth lens has refractive power. For example, the sixth lens may have positive refractive power. The sixth lens has a convex shape on one surface. As an example, the sixth lens may have a convex object-side surface. The sixth lens includes a spherical or aspherical surface. For example, both surfaces of the sixth lens may be aspherical. The sixth lens may be formed of a material with high light transmittance and excellent processability. For example, the sixth lens may be formed of plastic material. The sixth lens may be configured to have a predetermined refractive index. As an example, the refractive index of the sixth lens may be greater than 1.5. The sixth lens may have a predetermined Abbe number. For example, the Abbe number of the sixth lens may be greater than 20.

As described above, the first to sixth lenses may include a spherical surface or an aspherical surface. When the first to sixth lenses include an aspherical surface, the aspherical surface of the corresponding lens can be expressed by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \ldots \quad \text{Equation 1}$$

In Equation 1, c is an inverse number of a radius of curvature of a corresponding lens, k is a conic constant, r is a distance from any point on an aspherical surface to an optical axis, A to H and J are aspheric constants, and Z (or SAG) is a height in a direction of the optical axis from any point on the aspherical surface to the vertex of the corresponding aspherical surface.

The imaging lens system according to the above-described embodiments or the above-described aspects may further include an aperture and a filter. The aperture may be disposed between the first lens and the third lens or between the fourth lens and the fifth lens. The filter may be disposed between a rearmost lens and an imaging plane. The filter may be configured to block light of specific wavelengths. For reference, the filter described in this specification is configured to block infrared rays, but the wavelength of light blocked through the filter is not limited to infrared rays.

Figure 2A:
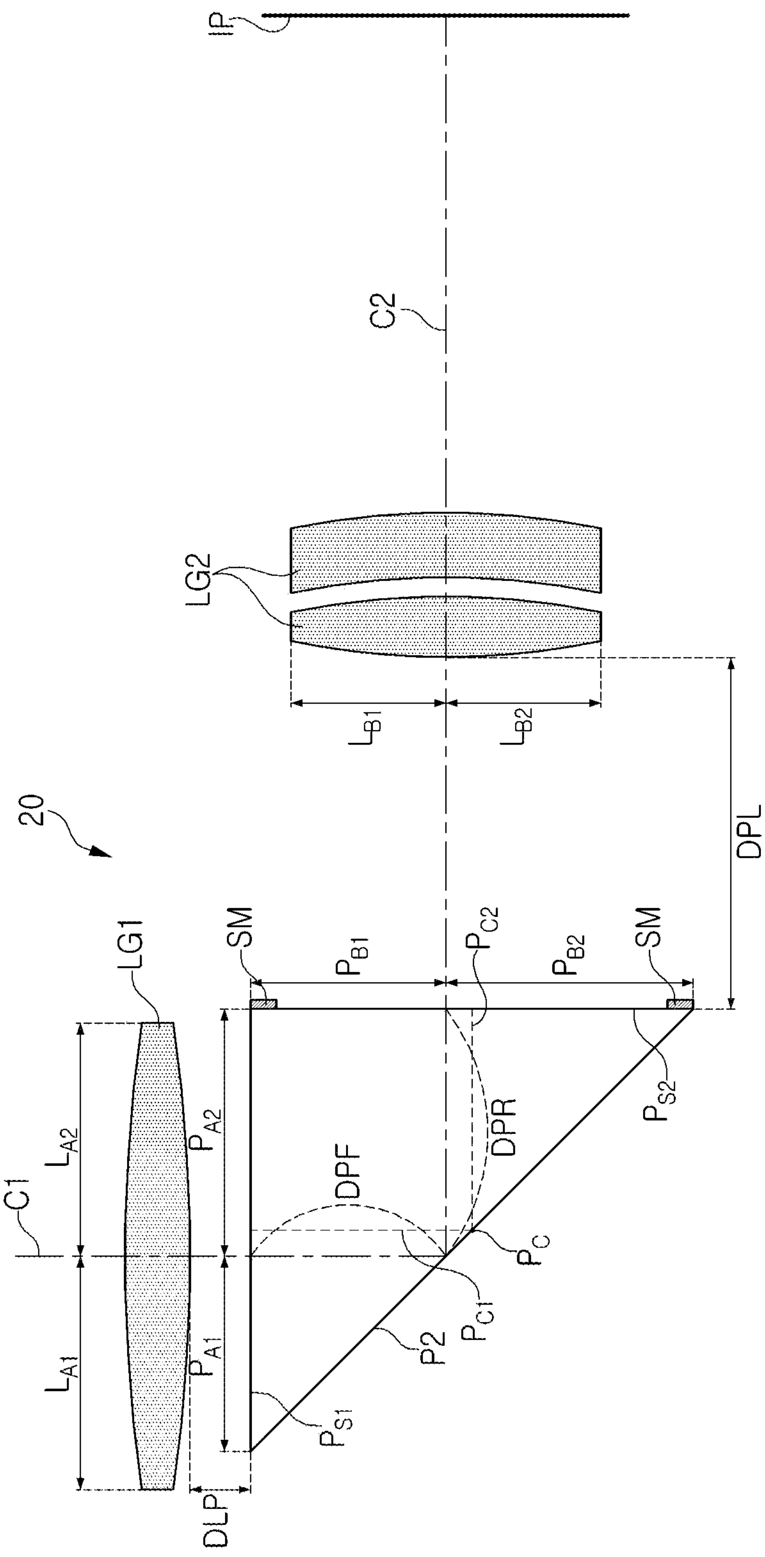
FIGS. 2A to 2C are block diagrams of a second example of an imaging lens system according to one or more embodiments of the present disclosure.
Figure 2B:
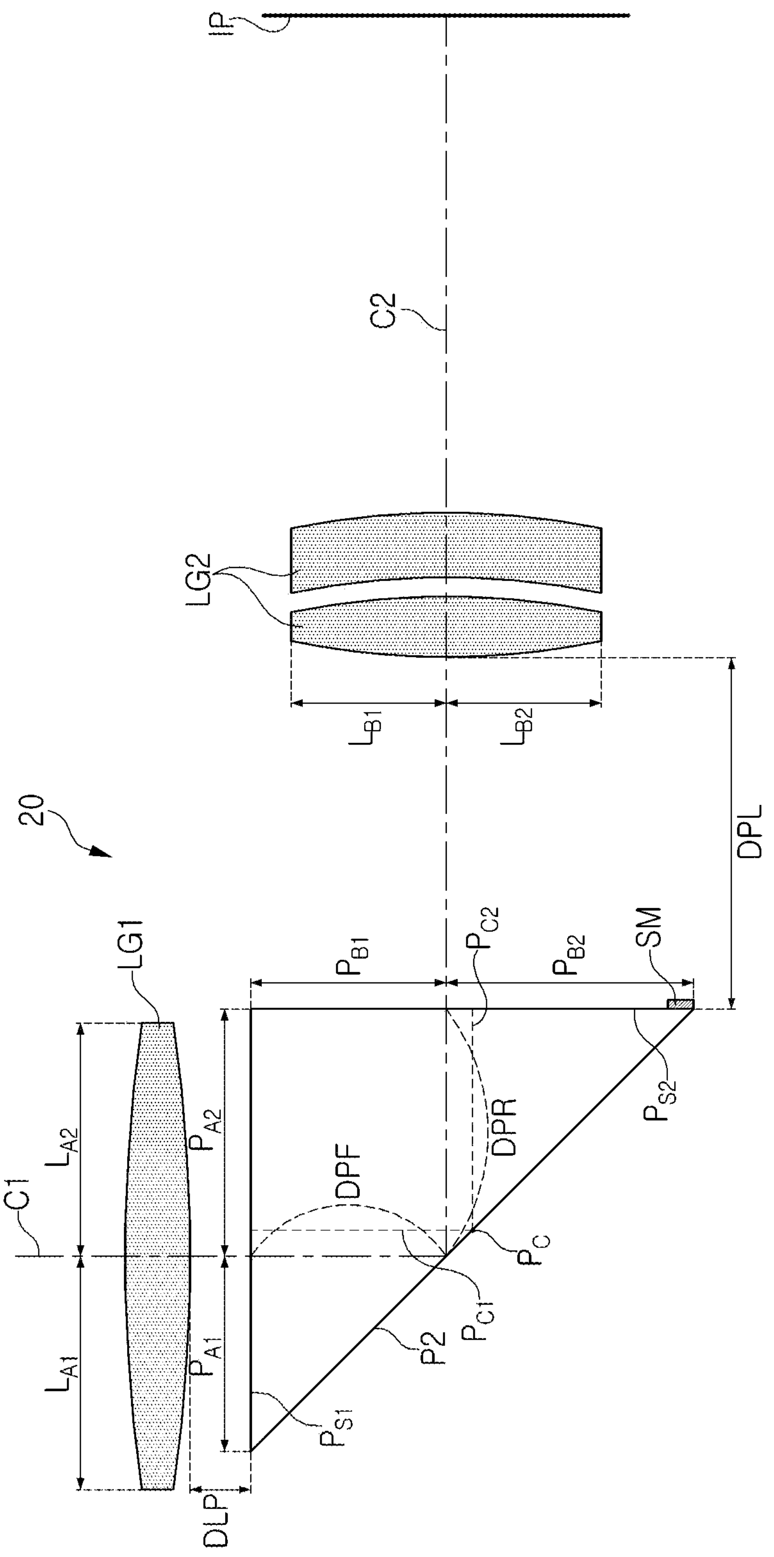
Figure 2C:
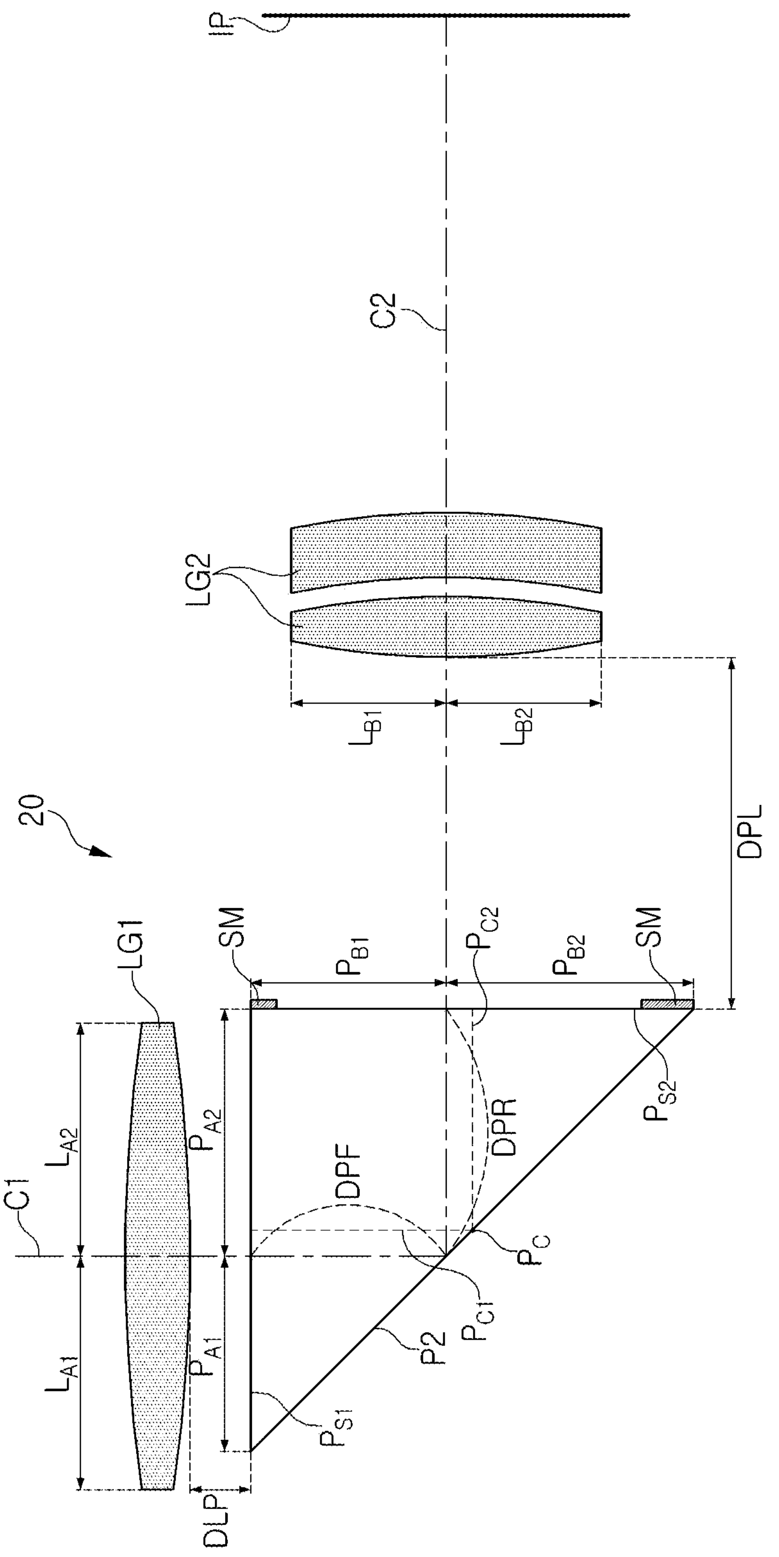
Figure 3:
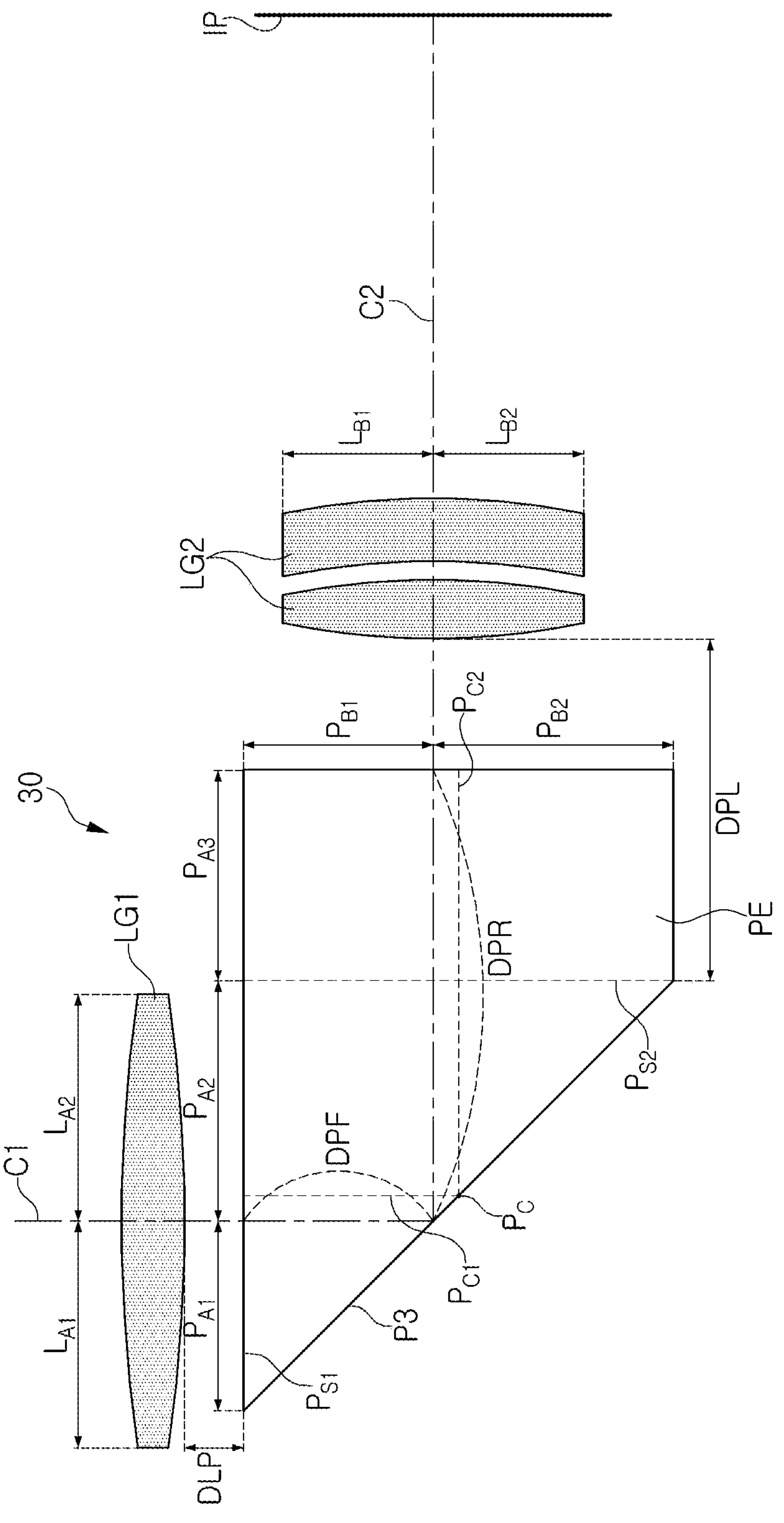
FIG. 3 is a block diagram of a third example of an imaging lens system according to one or more embodiments of the present disclosure.

Next, various examples of an imaging lens system including an optical path conversion element according to one or more embodiments of the disclosure will be described with reference to FIGS. 1 to 3.

First, an imaging lens system according to a first example will be described with reference to FIG. 1.

An imaging lens system 10 according to a first example may include a first lens group LG1, an optical path conversion element P1, and a second lens group LG2. However, the configuration of the imaging lens system 10 according to the first example is not limited to the first lens group LG1, the optical path conversion element P1, and the second lens group LG2. For example, the imaging lens system 10 according to the first example may further include a third lens group disposed between the second lens group LG2 and an imaging plane IP.

The first lens group LG1 may include one or more lenses. For example, the first lens group LG1 may be comprised of one to three lenses. However, the number of lenses constituting the first lens group LG1 is not limited to one to three. The first lens group LG1 may include a lens having positive refractive power. For example, in the first lens group LG1, a forwardmost lens disposed closest to an object may have positive refractive power. The first lens group LG1 may include a lens having a convex object-side surface. For example, a front lens disposed closest to the optical path conversion element P1 in the first lens group LG1 may have a convex object-side surface. The first lens group LG1 may be disposed in a unique form with respect to the optical path conversion element P1. For example, a first optical axis C1 of the first lens group LG1 may be eccentrically disposed in one direction with respect to a geometric first optical axis PC1 of the optical path conversion element P1.

The forwardmost lens may have an effective radius of a predetermined size. As an example, the forwardmost lens may have effective radii of sizes LA1 and LA2 centered on the first optical axis C1. LA1 is an effective radius to one side (a point furthest from the second lens group LG2) centered on the first optical axis C1, and LA2 is an effective radius to the other side (a point closest to the second lens group LG2) centered on the first optical axis C1. LA1 and LA2 may have different sizes, but do not necessarily have different sizes. For example, when the forwardmost lens is symmetrical, LA1 and LA2 may be the same size.

The second lens group LG2 may include one or more lenses. For example, the second lens group LG2 may be comprised of two or three lenses. However, the number of lenses constituting the second lens group LG2 is not limited to two or three. The second lens group LG2 may include a lens having positive refractive power. For example, in the second lens group LG, a rear lens disposed closest to the optical path conversion element may have positive refractive power. In the second lens group LG2, a rearmost lens disposed closest to an imaging plane may have a unique refractive power or shape. For example, the rearmost lens may have positive refractive power or may have a convex image-side surface. The second lens group LG2 may be disposed in a unique form with respect to the optical path conversion element P1. For example, a second optical axis C2 of the second lens group LG2 may be eccentrically disposed in one direction with respect to a geometric second optical axis PC2 of the optical path conversion element P1.

The rear lens may have an effective radius of a predetermined size. As an example, the rear lens may have effective radii of sizes LB1 and LB2 centered on the second optical axis C2. LB1 is an effective radius to one side (a point furthest from the first lens group LG1) centered on the second optical axis C2, and LB2 is an effective radius to the other side (a point closest to the first lens group LG1) centered on the second optical axis C2. LB1 and LB2 may have different sizes, but do not necessarily have different sizes. For example, when the rear lens is symmetrical, LB1 and LB2 may have the same size.

The optical path conversion element P1 may be disposed between the first lens group LG1 and the second lens group LG2. In addition, the optical path conversion element P1 may be disposed between a lens closest to an imaging plane in the first lens group LG1 and a lens closest to an object in the second lens group LG2. The optical path conversion element P1 may be disposed at a predetermined distance from the first lens group LG1 and the second lens group LG2. For example, an incident surface PS1 of the optical path conversion element P1 may be spaced from an image-side surface of a front lens closest to the optical path conversion element P1 in the first lens group LG1 by a predetermined distance DLP, and an exit surface PS2 of the optical path conversion element P1 may be spaced apart from an object-side surface of a rear lens closest to the optical path conversion element P1 in the second lens group LG2 by a predetermined distance DPL. Here, DLP and DPL may be positive numbers other than 0.

The optical path conversion element P1 may have a unique arrangement relationship with the first lens group LG1 and the second lens group LG2. For example, the optical path conversion element P1 may be disposed so that a geometric optical axis PC of the optical path conversion element P1 does not coincide with the first optical axis C1 of the first lens group LG1 and the second optical axis C2 of the second lens group LG2. As a specific example, a first line segment PC1 connecting the incident surface PS1 of the optical path conversion element P1 and the geometric optical axis PC of the optical path conversion element P1 may be formed to be closer to the second lens group LG2 than the first optical axis C1. As another example, a second line segment PC2 connecting the exit surface PS2 of the optical path conversion element P1 and the geometric optical axis PC of the optical path conversion element P1 may be formed to be further from the first lens group LG1 than the second optical axis C2.

The incident surface PS1 and the exit surface PS2 of the optical path conversion element P1 may be divided into unique shapes by the first optical axis C1 and the second optical axis C2. As an example, the shortest distance PA1 from a point in which the incident surface PS1 of the optical path conversion element P1 meets the first optical axis C1 to one side of the incident surface PS1 (a point furthest from the second lens group) may be less than the shortest distance PA2 from a point in which the incident surface PS1 of the optical path conversion element P1 meets the first optical axis C1 to the other side of the incident surface PS1 (a point closest to the second lens group). As another example, the shortest distance PB1 from a point in which an exit surface PS2 of the optical path conversion element P1 meets the second optical axis C2 to one side of the exit surface PS2 (a point closest to the first lens group) may be less than the shortest distance PB2 from a point where the exit surface PS2 of the optical path conversion element P1 meets the second optical axis C2 to the other side of the exit surface PS2 (a point furthest from the first lens group)

Next, an imaging lens system according to a second example will be described with reference to FIG. 2.

An imaging lens system 20 according to a second example may include a first lens group LG1, an optical path conversion element P2, and a second lens group LG2. However, the configuration of the imaging lens system 20 according to the second example is not limited to the first lens group LG1, the optical path conversion element P2, and the second lens group LG2. For example, the imaging lens system 20 according to the second example may further include a third lens group disposed between the second lens group LG2 and an imaging plane IP. For reference, since the configurations of the first lens group LG1 and the second lens group LG2 are the same as those of the imaging lens system 10 according to the first example, detailed descriptions of these configurations will be omitted.

The optical path conversion element P2 may be disposed between the first lens group LG1 and the second lens group LG2. In addition, the optical path conversion element P2 may be disposed between a lens closest to an imaging plane in the first lens group LG1 and a lens closest to an object in the second lens group LG2. The optical path conversion element P2 may be disposed at a predetermined distance from the first lens group LG1 and the second lens group LG2. For example, an incident surface PS1 of the optical path conversion element P2 may be spaced apart from an image-side surface of a front lens closest to the optical path conversion element P2 in the first lens group LG1 by a predetermined distance DLP, and an exit surface PS2 of the optical path conversion element P2 may be spaced apart from an object-side surface of a rear lens closest to the optical path conversion element P2 in the second lens group LG2 by a predetermined distance DPL. Here, DLP and DPL may be positive numbers other than 0.

The optical path conversion element P2 may have a unique arrangement relationship with the first lens group LG1 and the second lens group LG2. For example, the optical path conversion element P2 may be disposed so that a geometrical optical axis PC of the optical path conversion element P2 does not coincide with the first optical axis C1 of the first lens group LG1 and the second optical axis C2 of the second lens group LG2. As a specific example, a first line segment PC1 connecting an incident surface PS1 of the optical path conversion element P2 and a geometric optical axis PC of the optical path conversion element P2 may be formed to be closer to the second lens group LG2 than the first optical axis C1. As another example, a second line segment PC2 connecting an exit surface PS2 of the optical path conversion element P2 and the geometric optical axis PC of the optical path conversion element P2 may be formed to be further from the first lens group LG1 than the second optical axis C2.

The incident surface PS1 and the exit surface PS2 of the optical path conversion element P2 may be divided into unique shapes by the first optical axis C1 and the second optical axis C2. As an example, a shortest distance PA1 from a point in which the incident surface PS1 of the optical path conversion element P2 meets the first optical axis C1 to one side of the incident surface PS1 (a point furthest from the second lens group) may be less than the shortest distance PA2 from a point in which the incident surface PS1 of the optical path conversion element P2 meets the first optical axis C1 to the other side of the incident surface PS1 (a point closest to the second lens group). As another example, the shortest distance PB1 from a point in which the exit surface PS2 of the optical path conversion element P2 meets the second optical axis C2 to one side of the exit surface PS2 (a point closest to the first lens group) may be less than the shortest distance PB2 from a point in which the exit surface PS2 of the optical path conversion element P2 meets the second optical axis C2 to the other side of the exit surface PS2 (a point furthest from the first lens group).

The optical path conversion element P2 according to the second example may further include a component for adjusting the amount of light incident on the second lens group LG2. For example, a light blocking member SM may be formed on the exit surface PS2 of the optical path conversion element P2. The light blocking member SM may be formed integrally with or attached to the exit surface PS2 of the optical path conversion element P2. As an example, the light blocking member SM may be formed on the exit surface PS2 of the optical path conversion element P2 using a printing method. As another example, the light blocking member SM may be attached to the exit surface PS2 of the optical path conversion element P2 in a film shape. However, a forming method and shape of the light blocking member SM are not limited to the above-described forms.

In the optical path conversion element P2 according to the second example, the light blocking member SM may be formed by being limited to a portion of the exit surface PS2. For example, the light blocking member SM may be formed by being limited to a region corresponding to PB2 on the exit surface PS2 (see FIG. 2B). However, a formation region of the light blocking member SM is not limited to portion PB2 of the exit surface PS2. For example, the light blocking member SM may be formed in different sizes in portions PB1 and PB2 of the exit surface PS2. As a specific example, the size (or length) of the light blocking member SM formed in portion PB2 may be larger than the size (or length) of the light blocking member SM formed in portion PB1 (see FIG. 2C).

The imaging lens system 20 according to the second example configured as described above may reduce the flare phenomenon that may be caused by internal reflection of the optical path conversion element P2 through the light blocking member SM.

Next, an imaging lens system according to a third example will be described with reference to FIG. 3.

An imaging lens system 30 according to a third example may include a first lens group LG1, an optical path conversion element P3, and a second lens group LG2. However, the configuration of the imaging lens system 30 according to the third example is not limited to the first lens group LG1, the optical path conversion element P3, and the second lens group LG2. For example, the imaging lens system 30 according to the third example may further include a third lens group disposed between the second lens group LG2 and an imaging plane IP. For reference, since the configurations of the first lens group LG1 and the second lens group LG2 are the same as those of the imaging lens system 10 according to the first example, detailed descriptions of these configurations will be omitted.

The optical path conversion element P3 may be disposed between the first lens group LG1 and the second lens group LG2. In addition, the optical path conversion element P3 may be disposed between a lens closest to an imaging plane in the first lens group LG1 and a lens closest to an object in the second lens group LG2. The optical path conversion element P3 may be disposed at a predetermined distance from the first lens group LG1 and the second lens group LG2. For example, an incident surface PS1 of the optical path conversion element P3 may be spaced apart from an image-side surface of a front lens closest to the optical path conversion element P3 in the first lens group LG1 by a predetermined distance DLP, and an exit surface PS2 of the optical path conversion element P3 may be spaced apart from an object-side surface of a rear lens closest to the optical path conversion element P3 in the second lens group LG2 by a predetermined distance DPL. Here, DLP and DPL may be positive numbers other than 0.

The optical path conversion element P3 may have a unique arrangement relationship with the first lens group LG1 and the second lens group LG2. For example, the optical path conversion element P3 may be disposed so that a geometrical optical axis PC of the optical path conversion element P3 does not coincide with the first optical axis C1 of the first lens group LG1 and the second optical axis C2 of the second lens group LG2. As a specific example, a first line segment PC1 connecting an incident surface PS1 of the optical path conversion element P3 and a geometric optical axis PC of the optical path conversion element P3 may be formed to be closer to the second lens group LG2 than the first optical axis C1. As another example, a second line segment PC2 connecting an exit surface PS2 of the optical path conversion element P3 and a geometric optical axis PC of the optical path conversion element P3 may be formed to be further from the first lens group LG1 than the second optical axis C2.

The incident surface PS1 and the exit surface PS2 of the optical path conversion element P3 may be divided into unique shapes by the first optical axis C1 and the second optical axis C2. As an example, the shortest distance PA1 from a point in which the incident surface PS1 of the optical path conversion element P3 meets the first optical axis C1 to one side of the incident surface PS1 (a point furthest from the second lens group) may be less than the shortest distance PA2 from a point in which the incident surface PS1 of the optical path conversion element P3 meets the first optical axis C1 to the other side of the incident surface PS1 (a point closest to the second lens group). As another example, the shortest distance PB1 from a point in which the exit surface PS2 of the optical path conversion element P2 meets the second optical axis C2 to one side of the exit surface PS2 (a point closest to the first lens group) may be less than the shortest distance PB2 from a point in which the exit surface PS2 of the optical path conversion element P3 meets the second optical axis C2 to the other side of the exit surface PS2 (a point furthest from the first lens group).

The optical path conversion element P3 according to the third example may be configured to reduce a distance between the exit surface PS2 and the second lens group LG2. For example, the optical path conversion element P3 may include an extension portion PE extending in a direction of the second optical axis C2 as illustrated in FIG. 3. The extension portion PE may be formed integrally with the optical path conversion element P3 or may be attached to the optical path conversion element P3. In the latter case, the extension portion PE may be formed of a different material from the optical path conversion element P3. As an example, the optical path conversion element P3 and the extension portion PE may have different refractive indices within a range that satisfies Conditional Expression $0.8<NP3/NPE<1.2$. For reference, NP3 refers to a refractive index of the optical path conversion element P3, and NPE is a refractive index of the extension portion.

The optical path conversion element P3 according to the third example may be configured to prevent light from entering through the extension portion PE. For example, a side surface of the extension portion PE that is generally parallel to the second optical axis may be configured to be shielded from light by a predetermined substance or material. The extension portion PE may be formed to have a predetermined length PA3. For example, PA3 may be formed to have a smaller size than PA1. However, a size of PA3 does not necessarily have to be smaller than PA1.

The imaging lens system 30 according to the third example configured as described above may reduce the flare phenomenon that may be caused by internal reflection of the optical path conversion element P3 through the extension portion PE.

Next, lens shapes of several examples of an imaging lens system according to one or more of the above embodiments will be described with reference to FIGS. 4 to 8. For reference, although not shown in the accompanying drawings, an imaging lens system according to fourth through eighth examples described below may have an arrangement structure that is identical to or similar to that of the first lens group and the second lens group of the imaging lens system according to the first to third examples described above. As an example, a first lens group, an optical path conversion element, and a second lens group of the imaging lens system according to the fourth through eighth examples may include features according to the first example. As another example, a first lens group, an optical path conversion element, and a second lens group of the imaging lens system according to the fourth through eighth examples may include features according to the second example. As another example, a first lens group, an optical path conversion element, and a second lens group of the imaging lens system according to the fourth through eighth examples may also include features according to the third example.

Figure 4:
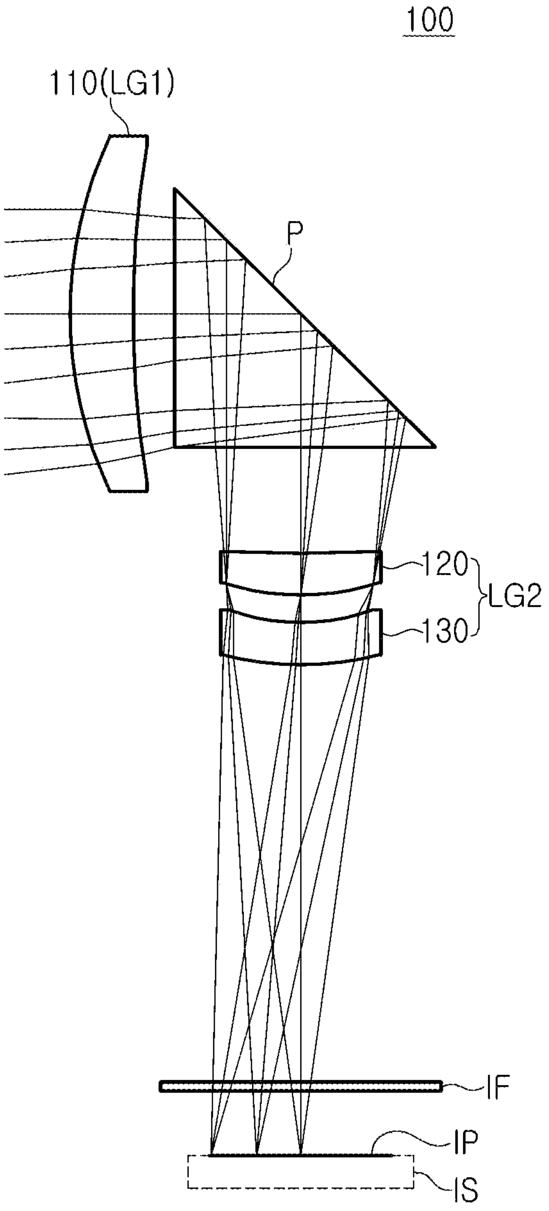
FIG. 4 is a block diagram of a fourth example of an imaging lens system according to one or more embodiments of the present disclosure.

First, an imaging lens system according to a fourth example will be described with reference to FIG. 4.

An imaging lens system 100 may be comprised of a plurality of lens groups. For example, the imaging lens system 100 may include a first lens group LG1 and a second lens group LG2. The first lens group LG1 and the second lens group LG2 may be arranged in order from an object side. The first lens group LG1 and the second lens group LG2 may include one or more lenses. The imaging lens system 100 may include an optical path conversion element. As an example, the imaging lens system 100 may include a prism P disposed between the first lens group LG1 and the second lens group LG2.

The first lens group LG1 may be comprised of a first lens 110. The first lens 110 has positive refractive power and has a convex object-side surface and a concave image-side surface.

The second lens group LG2 may be comprised of a second lens 120 and a third lens 130. The second lens 120 has positive refractive power and has a concave object-side surface and a convex image-side surface. The third lens 130 has negative refractive power and has a concave object-side surface and a convex image-side surface.

The imaging lens system 100 may further include other optical elements in addition to the first to third lenses 110 to 130. For example, the imaging lens system 100 may further include an aperture ST, a filter IF, and an imaging plane IP. The aperture ST may be disposed between the second lens 120 and the third lens 130. The filter IF may be disposed between the third lens 130 and the imaging plane IP. The imaging plane IP may be formed in a position in which light incident from the first to third lenses 110 to 130 forms an image. For example, the imaging plane IP may be formed on one surface of an image sensor IS of a camera module or on an optical element disposed inside the image sensor IS.

Table 1 shows lens characteristics of the imaging lens system according to this example, and Table 2 shows an aspheric value of the imaging lens system according to this example.

TABLE 1

| Surface Number | Division | Radius of Curvature | Thickness/ Distance | Index | Abbe Number | Effective Radius |
|---|---|---|---|---|---|---|
| S1 | First lens | 10.0000 | 1.5000 | 1.535 | 55.73 | 4.403 |
| S2 | | 25.0000 | 1.0000 | | | 4.157 |
| S3 | Prism | Infinity | 3.0000 | 1.717 | 29.50 | 3.943 |
| S4 | | Infinity | 3.2000 | 1.717 | 29.50 | 3.375 |
| S5 | | Infinity | 2.5000 | | | 2.769 |
| S6 | Second lens | −90.8444 | 1.0000 | 1.544 | 55.99 | 1.934 |
| S7 | Aperture | −6.9210 | 0.7000 | | | 1.773 |
| S8 | Third lens | −5.3215 | 1.0000 | 1.639 | 23.49 | 1.809 |
| S9 | | −8.6124 | 10.0000 | | | 1.997 |
| S10 | Filter | Infinity | 0.2100 | 1.517 | 64.20 | |
| S11 | | Infinity | 1.5386 | | | |
| S12 | Imaging plane | Infinity | 0.0000 | | | |

TABLE 2

| Surface Number | K | A | B | C | D |
|---|---|---|---|---|---|
| S1 | 0 | −4.4040E−05 | −8.8602E−07 | −1.2890E−08 | 0 |
| S2 | 0 | 4.2349E−05 | 8.1645E−07 | 1.0517E−08 | 0 |

TABLE 2-continued

| Surface Number | K | A | B | C | D |
|---|---|---|---|---|---|
| S6 | 0 | −4.7277E−05 | 8.3687E−06 | 1.2894E−06 | −9.2948E−08 |
| S7 | 0 | 1.8401E−05 | −1.0595E−05 | −1.3200E−06 | 2.7045E−07 |
| S8 | 0 | −3.2635E−06 | 1.2979E−05 | 1.6545E−06 | −4.1610E−07 |
| S9 | 0 | 1.1093E−05 | −7.9085E−06 | −2.8644E−07 | 4.7632E−07 |

Figure 5:
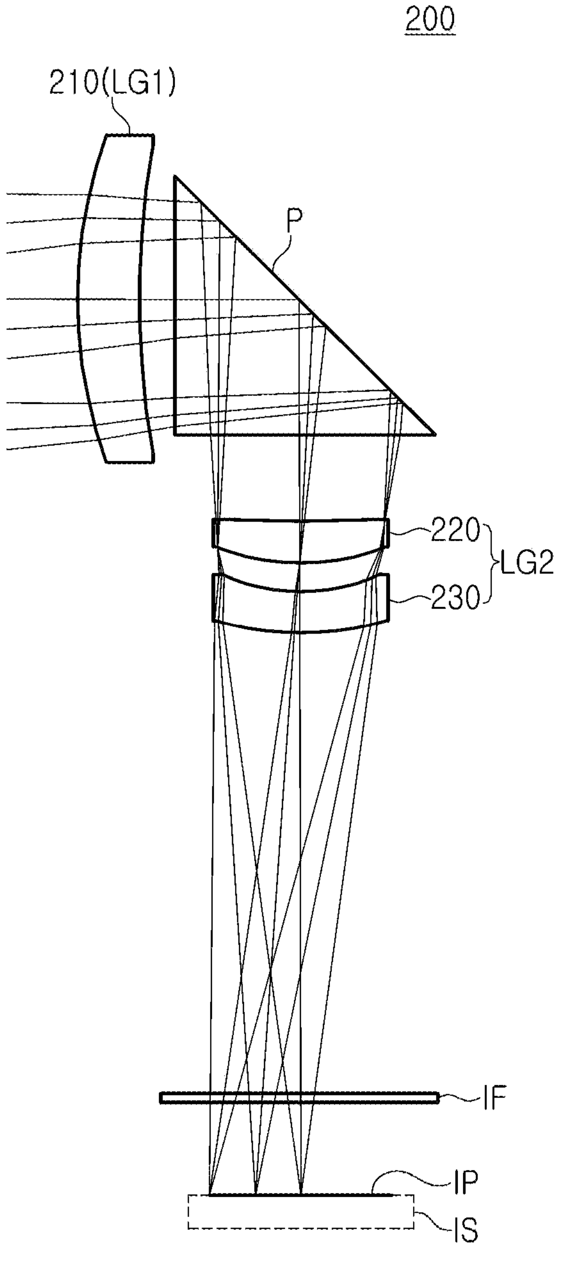
FIG. 5 is a block diagram of a fifth example of an imaging lens system according to one or more embodiments of the present disclosure.

Next, an imaging lens system according to a fifth example will be described with reference to FIG. 5.

An imaging lens system 200 may be comprised of a plurality of lens groups. For example, the imaging lens system 200 may include a first lens group LG1 and a second lens group LG2. The first lens group LG1 and the second lens group LG2 may be arranged in order from an object side. The first lens group LG1 and the second lens group LG2 may include one or more lenses. The imaging lens system 200 may include an optical path conversion element. As an example, the imaging lens system 200 may include a prism P disposed between the first lens group LG1 and the second lens group LG2.

The first lens group LG1 may be comprised of a first lens 210. The first lens 210 has positive refractive power and has a convex object-side surface and a concave image-side surface.

The second lens group LG2 may be comprised of a second lens 220 and a third lens 230. The second lens 220 has positive refractive power and has a concave object-side surface and a convex image-side surface. The third lens 230 has negative refractive power and has a concave side surface and a convex image-side surface.

The imaging lens system 200 may further include other optical elements in addition to the first to third lenses 210 to 230. For example, the imaging lens system 200 may further include an aperture ST, a filter IF, and an imaging plane IP. The aperture ST may be disposed between the second lens 220 and the third lens 230. The filter IF may be disposed between the third lens 230 and the imaging plane IP. The imaging plane IP may be formed in a position in which light incident from the first to third lenses 210 to 230 forms an image. For example, the imaging plane IP may be formed on one surface of an image sensor IS of a camera module or on an optical element disposed inside the image sensor IS.

Table 3 shows lens characteristics of the imaging lens system according to this example, and Table 4 shows an aspheric value of the imaging lens system according to this example.

TABLE 3

| Surface Number | Division | Radius of Curvature | Thickness/ Distance | Index | Abbe Number | Effective Radius |
|---|---|---|---|---|---|---|
| S1 | First lens | 11.4946 | 1.5000 | 1.535 | 55.73 | 4.063 |
| S2 | | 24.9858 | 0.8000 | | | 3.795 |
| S3 | Prism | Infinity | 3.0000 | 1.717 | 29.50 | 3.657 |
| S4 | | Infinity | 3.3000 | 1.717 | 29.50 | 3.179 |
| S5 | | Infinity | 2.0000 | | | 2.652 |
| S6 | Second lens | −47.6350 | 1.0000 | 1.544 | 55.99 | 2.103 |
| S7 | Aperture | −5.9554 | 0.7000 | | | 1.990 |
| S8 | Third lens | −4.6803 | 1.0000 | 1.639 | 23.49 | 1.997 |
| S9 | | −7.2662 | 11.0000 | | | 2.198 |
| S10 | Filter | Infinity | 0.2100 | 1.517 | 64.20 | |
| S11 | | Infinity | 2.2406 | | | |
| S12 | Imaging plane | Infinity | 0.0000 | | | |

TABLE 4

| Surface Number | K | A | B | C | D |
|---|---|---|---|---|---|
| S1 | 0 | −6.5528E−05 | −1.3505E−06 | −4.0319E−08 | 0 |
| S2 | 0 | 6.2850E−05 | 1.3454E−06 | 6.3285E−08 | 0 |
| S6 | 0 | −2.8941E−05 | 1.1860E−05 | 8.4266E−07 | −4.2724E−07 |
| S7 | 0 | −2.0255E−06 | −1.2545E−05 | −9.3667E−07 | 4.3281E−07 |
| S8 | 0 | 2.7047E−05 | 1.9673E−05 | 3.5298E−06 | 3.3037E−07 |
| S9 | 0 | −5.2100E−06 | −7.4473E−06 | 3.0452E−07 | 5.7464E−07 |

Figure 6:
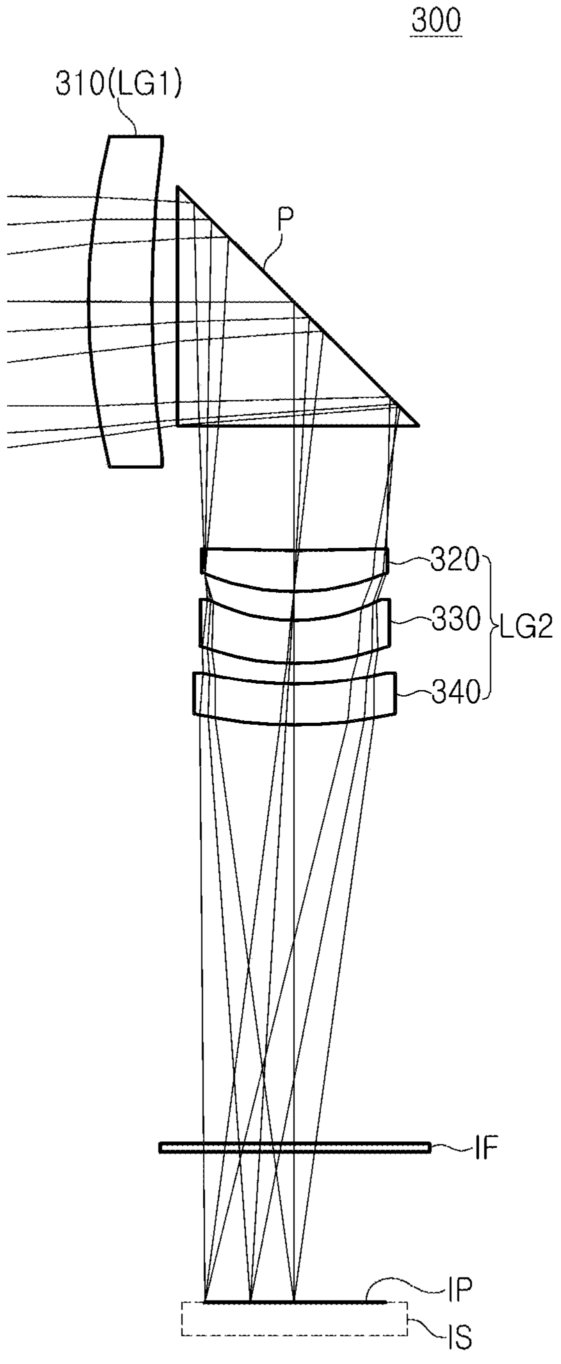
FIG. 6 is a block diagram of a sixth example of an imaging lens system according to one or more embodiments of the present disclosure.

Next, an imaging lens system according to a sixth example will be described with reference to FIG. 6.

An imaging lens system 300 may be comprised of a plurality of lens groups. For example, the imaging lens system 300 may include a first lens group LG1 and a second lens group LG2. The first lens group LG1 and the second lens group LG2 may be arranged in order from an object side. The first lens group LG1 and the second lens group LG2 may include one or more lenses. The imaging lens system 300 may include an optical path conversion element. As an example, the imaging lens system 300 may include a prism P disposed between the first lens group LG1 and the second lens group LG2.

The first lens group LG1 may be comprised of a first lens 310. The first lens 310 has positive refractive power and has a convex object-side surface and a concave image-side surface.

The second lens group LG2 may be comprised of a second lens 320, a third lens 330, and a fourth lens 340. The second lens 320 has positive refractive power and has a concave object-side surface and a convex image-side surface. The third lens 330 has negative refractive power and has a concave object-side surface and a convex image-side surface. The fourth lens 340 has negative refractive power and has a concave object-side surface and a convex image-side surface.

The imaging lens system 300 may further include other optical elements in addition to the first to fourth lenses 310 to 340. For example, the imaging lens system 300 may further include an aperture ST, a filter IF, and an imaging plane IP. The aperture ST may be disposed between the second lens 320 and the third lens 330. The filter IF may be disposed between the fourth lens 340 and the imaging plane IP. The imaging plane IP may be formed in a position in which light incident from the first to fourth lenses 310 to 340 forms an image. For example, the imaging plane IP may be formed on one surface of an image sensor IS of a camera module or on an optical element disposed inside the image sensor IS.

Table 5 shows lens characteristics of the imaging lens system according to this example, and Table 6 shows an aspheric value of the imaging lens system according to this example.

TABLE 5

| Surface Number | Division | Radius of Curvature | Thickness/ Distance | Index | Abbe Number | Effective Radius |
|---|---|---|---|---|---|---|
| S1 | First lens | 15.9944 | 1.5000 | 1.535 | 55.73 | 4.069 |
| S2 | | 34.5390 | 0.6000 | | | 3.813 |
| S3 | Prism | Infinity | 2.8000 | 1.717 | 29.50 | 3.726 |
| S4 | | Infinity | 2.9500 | 1.717 | 29.50 | 3.341 |
| S5 | | Infinity | 3.0000 | | | 2.935 |
| S6 | Second lens | −92.4220 | 1.0000 | 1.544 | 55.99 | 2.221 |
| S7 | Aperture | −5.4456 | 0.7000 | | | 2.138 |
| S8 | Third lens | −4.3148 | 1.0000 | 1.639 | 23.49 | 2.121 |

TABLE 5-continued

| Surface Number | Division | Radius of Curvature | Thickness/ Distance | Index | Abbe Number | Effective Radius |
|---|---|---|---|---|---|---|
| S9 | | −6.5954 | 0.5000 | | | 2.325 |
| S10 | Fourth lens | −10.0592 | 1.0000 | 1.661 | 20.38 | 2.369 |
| S11 | | −11.0292 | 10.0000 | | | 2.511 |
| S12 | Filter | Infinity | 0.2100 | 1.517 | 64.20 | |
| S13 | | Infinity | 3.5946 | | | |
| S14 | Imaging plane | Infinity | 0.0000 | | | |

TABLE 6

| Surface Number | K | A | B | C | D |
|---|---|---|---|---|---|
| S1 | 0 | −8.5142E−05 | −4.1968E−07 | −3.8182E−08 | 0 |
| S2 | 0 | 7.4387E−05 | 6.6783E−07 | 1.5635E−07 | 0 |
| S6 | 0 | −2.6865E−05 | 6.4982E−07 | −1.3644E−06 | −5.5745E−07 |
| S7 | 0 | 1.9276E−05 | −7.4418E−07 | 5.3075E−07 | 2.2793E−07 |
| S8 | 0 | 6.4500E−05 | 3.0529E−05 | 8.3788E−06 | 2.3205E−06 |
| S9 | 0 | −4.3435E−05 | −8.6537E−06 | 1.3863E−06 | 8.7939E−07 |
| S10 | 0 | 4.5416E−05 | −1.6220E−06 | −2.2711E−06 | −3.2509E−07 |
| S11 | 0 | −3.7768E−05 | 2.1799E−06 | 7.3360E−07 | −3.6257E−07 |

Figure 7:
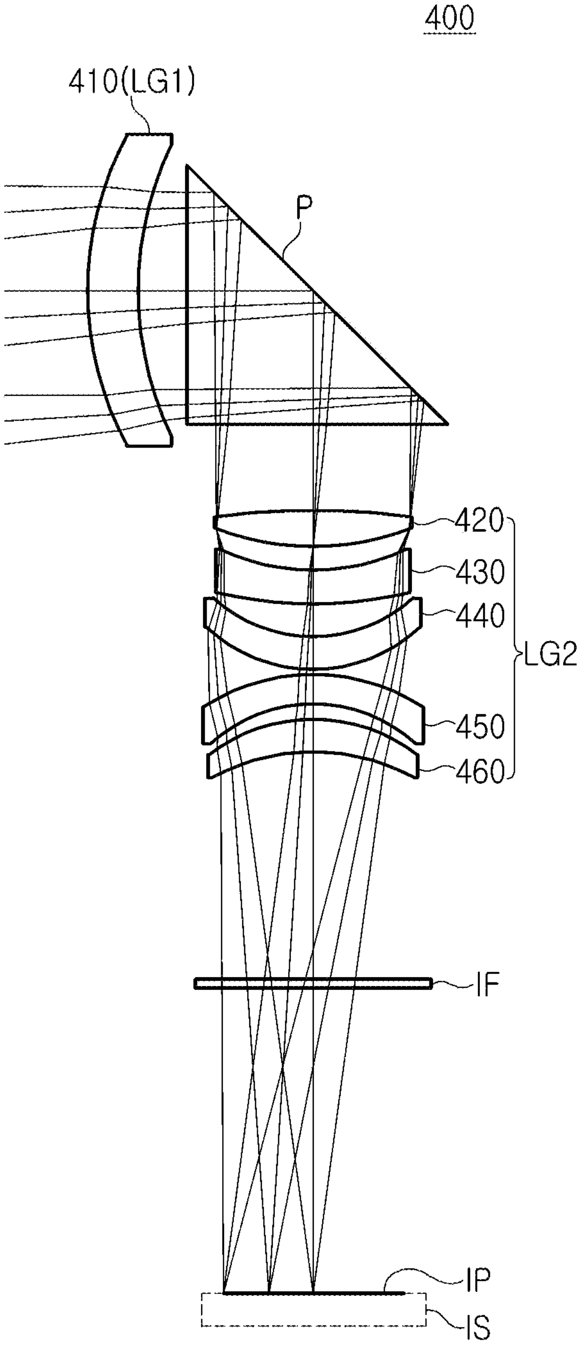
FIG. 7 is a block diagram of a seventh example of an imaging lens system according to one or more embodiments of the present disclosure.

Next, an imaging lens system according to a seventh example will be described with reference to FIG. 7.

An imaging lens system 400 may be comprised of a plurality of lens groups. For example, the imaging lens system 400 may include a first lens group LG1 and a second lens group LG2. The first lens group LG1 and the second lens group LG2 may be arranged in order from an object side. The first lens group LG1 and the second lens group LG2 may include one or more lenses. The imaging lens system 400 may include an optical path conversion element. As an example, the imaging lens system 400 may include a prism P disposed between the first lens group LG1 and the second lens group LG2.

The first lens group LG1 may be comprised of a first lens 410. The first lens 410 has positive refractive power and has a convex object-side surface and a concave image-side surface.

The second lens group LG2 may be comprised of a second lens 420, a third lens 430, a fourth lens 440, a fifth lens 450, and a sixth lens 460. The second lens 420 has positive refractive power and has a convex object-side surface and a convex image-side surface. The third lens 430 has negative refractive power and has a concave object-side surface and a convex image-side surface. The fourth lens 440 has positive refractive power and has a concave object-side surface and a convex image-side surface. The fifth lens 450 has negative refractive power and has a convex object-side surface and a concave image-side surface. The sixth lens 460 has positive refractive power and has a convex object-side surface and a concave image-side surface.

The imaging lens system 400 may further include other optical elements in addition to the first to sixth lenses 410 to 460. For example, the imaging lens system 400 may further include an aperture ST, a filter IF, and an imaging plane IP. The aperture ST may be disposed between the second lens 420 and the third lens 430. The filter IF may be disposed between the sixth lens 460 and the imaging plane IP. The imaging plane IP may be formed in a position in which light incident from the first to sixth lenses 410 to 460 forms an image. For example, the imaging plane IP may be formed on one surface of an image sensor IS of a camera module or on an optical element disposed inside the image sensor IS.

Table 7 shows lens characteristics of the imaging lens system according to this example, and Table 8 shows an aspheric value of the imaging lens system according to this example.

TABLE 7

| Surface Number | Division | Radius of Curvature | Thickness/ Distance | Index | Abbe Number | Effective Radius |
|---|---|---|---|---|---|---|
| S1 | First lens | 7.7388 | 1.2000 | 1.535 | 55.73 | 3.870 |
| S2 | | 7.8463 | 1.2000 | | | 3.547 |
| S3 | Prism | Infinity | 3.0000 | 1.717 | 29.50 | 3.480 |
| S4 | | Infinity | 3.2500 | 1.717 | 29.50 | 3.141 |
| S5 | | Infinity | 2.0000 | | | 2.774 |
| S6 | Second lens | 20.9024 | 0.8668 | 1.544 | 55.99 | 2.355 |
| S7 | Aperture | −6.6007 | 0.5711 | | | 2.303 |
| S8 | Third lens | −5.1367 | 0.8000 | 1.639 | 23.49 | 2.269 |
| S9 | | −9.8419 | 0.8000 | | | 2.387 |
| S10 | Fourth lens | −3.4906 | 0.7890 | 1.661 | 20.38 | 2.393 |
| S11 | | −3.6985 | 0.1000 | | | 2.648 |
| S12 | Fifth lens | 4.8382 | 0.7286 | 1.639 | 23.49 | 2.767 |
| S13 | | 3.7149 | 0.3625 | | | 2.566 |
| S14 | Sixth lens | 4.2622 | 0.8000 | 1.535 | 55.73 | 2.623 |
| S15 | | 5.0910 | 5.4139 | | | 2.545 |
| S16 | Filter | Infinity | 0.2100 | 1.517 | 64.20 | |
| S17 | | Infinity | 3.5946 | | | |
| S18 | Imaging plane | Infinity | 0.0000 | | | |

TABLE 8

| Surface Number | K | A | B | C | D |
|---|---|---|---|---|---|
| S1 | 0 | −8.6837E−05 | −9.8569E−07 | −1.2347E−07 | 0 |
| S2 | 0 | 5.9549E−05 | 2.0603E−07 | 1.9592E−07 | 0 |
| S6 | 0 | 1.8345E−04 | 8.2741E−06 | −1.3488E−06 | −4.7470E−07 |
| S7 | 0 | −1.4682E−04 | −4.9832E−06 | 7.1204E−07 | 1.9086E−07 |
| S8 | 0 | 2.2890E−04 | 3.6276E−05 | 8.6168E−06 | 2.3967E−06 |
| S9 | 0 | −1.4794E−04 | −3.2060E−06 | 3.4719E−06 | 1.4639E−06 |
| S10 | 0 | −2.1454E−04 | −1.7495E−05 | −1.1792E−06 | −4.7828E−07 |
| S11 | 0 | 2.8802E−04 | 2.5376E−05 | 1.8281E−06 | −7.8154E−08 |
| S12 | 0 | 2.6613E−05 | 6.9002E−07 | 2.5975E−07 | −6.1788E−09 |
| S13 | 0 | −2.2587E−05 | −3.1238E−06 | −7.7703E−07 | −6.5644E−08 |
| S14 | 0 | 3.6841E−05 | 6.4672E−06 | 1.0073E−06 | 5.2552E−08 |
| S15 | 0 | 3.6841E−05 | 6.4672E−06 | 1.0073E−06 | 5.2552E−08 |

Figure 8:
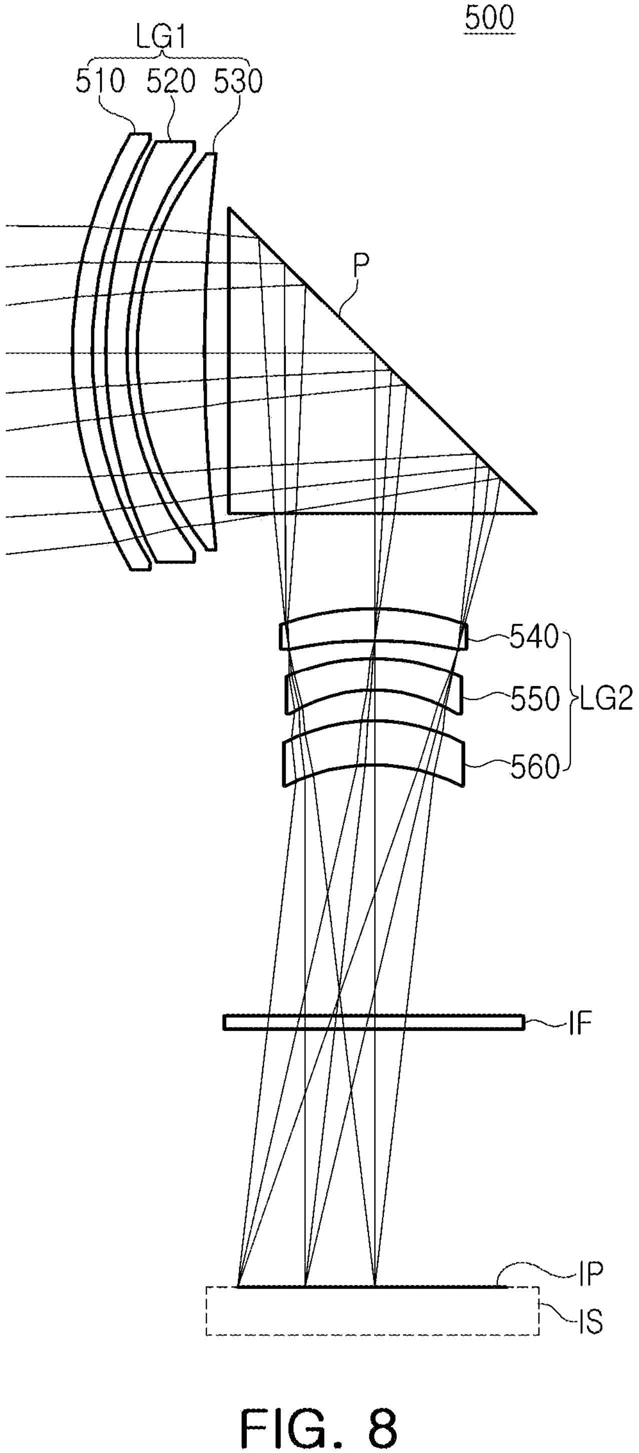
FIG. 8 is a block diagram of an eighth example of an imaging lens system according to one or more embodiments of the present disclosure.

Next, an imaging lens system according to an eighth example will be described with reference to FIG. 8.

An imaging lens system 500 may be comprised of a plurality of lens groups. For example, the imaging lens system 500 may include a first lens group LG1 and a second lens group LG2. The first lens group LG1 and the second lens group LG2 may be arranged in order from an object side. The first lens group LG1 and the second lens group LG2 may include one or more lenses. The imaging lens system 500 may include an optical path conversion element. As an example, the imaging lens system 500 may include a prism P disposed between the first lens group LG1 and the second lens group LG2.

The first lens group LG1 may be comprised of a first lens 510, a second lens 520, and a third lens 530. The first lens 510 has negative refractive power and has a convex object-side surface and a concave image-side surface. The second lens 520 has negative refractive power and has a concave object-side surface and a convex image-side surface. The third lens 530 has positive refractive power and has a concave object-side surface and a convex image-side surface.

The second lens group LG2 may be comprised of a fourth lens 540, a fifth lens 550, and a sixth lens 560. The fourth lens 540 has positive refractive power and has a convex object-side surface and a concave image-side surface. The fifth lens 550 has negative refractive power and has a convex object-side surface and a concave image-side surface. The sixth lens 560 has positive refractive power and has a convex object-side surface and a concave image-side surface.

The imaging lens system 500 may further include other optical elements in addition to the first to sixth lenses 510 to 560. For example, the imaging lens system 500 may further include an aperture ST, a filter IF, and an imaging plane IP. The aperture ST may be disposed between the fourth lens 540 and the fifth lens 550. The filter IF may be disposed between the sixth lens 560 and the imaging plane IP. The imaging plane IP may be formed in a position in which light incident from the first to sixth lenses 510 to 560 forms an image. For example, the imaging plane IP may be formed on one surface of an image sensor IS of a camera module or on an optical element disposed inside the image sensor IS.

Table 9 shows lens characteristics of the imaging lens system according to this example, and Table 10 shows an aspheric value of the imaging lens system according to this example.

TABLE 9

| Surface Number | Division | Radius of Curvature | Thickness/ Distance | Index | Abbe Number | Effective Radius |
|---|---|---|---|---|---|---|
| S1 | First lens | 6.9396 | 0.3000 | 1.535 | 55.73 | 3.870 |
| S2 | | 6.5278 | 0.2473 | | | 3.547 |
| S3 | Second lens | 7.5817 | 0.3000 | 1.639 | 23.49 | 2.355 |
| S4 | | 5.1562 | 0.1692 | | | 2.303 |
| S5 | Third lens | 4.9781 | 1.0835 | 1.535 | 55.73 | 2.269 |
| S6 | | 28.0028 | 0.4000 | | | 2.387 |
| S7 | Prism | Infinity | 2.3000 | 1.717 | 29.50 | 3.480 |
| S8 | | Infinity | 2.6000 | 1.717 | 29.50 | 3.141 |
| S9 | | Infinity | 1.5000 | | | 2.774 |
| S10 | Fourth lens | 4.4324 | 0.5000 | 1.544 | 55.99 | 2.393 |
| S11 | Aperture | 6.8425 | 0.3000 | | | 2.648 |
| S12 | Fifth lens | 3.3432 | 0.5000 | 1.639 | 23.49 | 2.767 |
| S13 | | 2.4215 | 0.5000 | | | 2.566 |
| S14 | Sixth lens | 3.0382 | 0.7000 | 1.639 | 23.49 | 2.623 |
| S15 | | 2.8618 | 4.0000 | | | 2.545 |
| S16 | Filter | Infinity | 0.2100 | 1.517 | 64.20 | |
| S17 | | Infinity | 4.1290 | | | |
| S18 | Imaging plane | Infinity | 0.0000 | | | |

TABLE 10

| Surface Number | K | A | B | C | D |
|---|---|---|---|---|---|
| S1 | 0 | −3.7349E−05 | 3.9811E−06 | 2.0718E−07 | 1.3750E−08 |
| S2 | 0 | 4.4202E−05 | −3.5396E−06 | −2.4412E−07 | −1.4705E−08 |
| S3 | 0 | 6.8457E−06 | 1.3726E−06 | 4.9963E−08 | 1.7244E−09 |
| S4 | 0 | 1.1637E−05 | 1.4177E−06 | 6.2764E−08 | 9.9268E−09 |
| S5 | 0 | −7.7969E−06 | −7.6760E−06 | −3.5121E−07 | −2.7709E−08 |
| S6 | 0 | −3.7344E−05 | 1.1286E−05 | 4.3633E−07 | 1.9049E−08 |
| S10 | 0 | −1.0734E−04 | 4.4178E−05 | 6.4693E−05 | 3.5935E−05 |
| S11 | 0 | 2.6440E−04 | 1.0076E−05 | 7.8520E−05 | 6.0939E−05 |
| S12 | 0 | 2.1221E−04 | 1.3926E−04 | −3.9247E−05 | −8.0228E−06 |
| S13 | 0 | −1.0163E−04 | 1.3319E−04 | 1.2722E−04 | −1.0935E−04 |
| S14 | 0 | −2.2756E−04 | −4.3703E−04 | −1.3238E−04 | 4.3058E−05 |
| S15 | 0 | −9.8133E−04 | −1.2161E−03 | −2.3425E−04 | 7.1905E−05 |

Table 11 shows characteristic values of the imaging lens system according to the fourth to eighth examples.

TABLE 11

| Division | Fourth Example | Fifth Example | Sixth Example | Seventh Example | Eighth Example |
|---|---|---|---|---|---|
| f1 | 30.115 | 38.321 | 54.175 | 215.989 | −275.690 |
| f2 | 13.714 | 12.407 | 10.594 | 9.325 | −26.494 |
| f3 | −24.718 | −24.229 | −23.550 | −18.003 | 11.138 |
| f4 | — | — | −293.511 | 184.414 | 21.556 |
| f5 | — | — | — | −33.511 | −17.430 |
| f6 | — | — | — | 36.635 | 140.872 |
| TTL | 25.649 | 26.751 | 28.855 | 25.686 | 19.739 |
| f | 18.532 | 18.610 | 18.610 | 18.610 | 17.000 |
| ImgH | 7.150 | 7.150 | 7.150 | 7.150 | 7.150 |
| f1G | 30.115 | 38.321 | 54.175 | 215.988 | 21.573 |
| f2G | 32.186 | 27.007 | 22.715 | 18.630 | 596.745 |
| LA1 | 4.403 | 4.063 | 4.069 | 3.870 | 3.870 |
| LA2 | 4.403 | 4.063 | 4.069 | 3.870 | 3.870 |
| PA1 | 3.000 | 3.000 | 2.800 | 3.000 | 2.300 |
| PA2 | 3.200 | 3.300 | 2.950 | 3.250 | 2.600 |
| PB1 | 3.000 | 3.000 | 2.800 | 3.000 | 2.300 |
| PB2 | 3.200 | 3.300 | 2.950 | 3.250 | 2.600 |
| LB1 | 1.934 | 2.103 | 2.221 | 2.355 | 2.393 |
| LB2 | 1.934 | 2.103 | 2.221 | 2.355 | 2.393 |

Tables 12 and 13 are conditional expression values of the imaging lens system according to the fourth to eighth examples.

TABLE 12

| Conditional Expression | Fourth Example | Fifth Example | Sixth Example | Seventh Example | Eighth Example |
|---|---|---|---|---|---|
| DPR/DPF | 1.067 | 1.100 | 1.054 | 1.083 | 1.130 |
| LA1/LA2 | 1.000 | 1.000 | 1.000 | 1.000 | 1.000 |
| LB1/LB2 | 1.000 | 1.000 | 1.000 | 1.000 | 1.000 |
| PA1/PA2 | 0.938 | 0.909 | 0.949 | 0.923 | 0.885 |
| PB1/PB2 | 0.938 | 0.909 | 0.949 | 0.923 | 0.885 |
| DLP | 1.000 | 0.800 | 0.600 | 1.200 | 0.247 |
| DPL | 2.500 | 2.000 | 3.000 | 2.000 | 1.500 |
| (DLP + DPF)/(DPL + DPR) | 0.702 | 0.717 | 0.571 | 0.800 | 0.659 |
| fG1/DLPL | 3.105 | 4.211 | 5.794 | 22.856 | 3.173 |

TABLE 13

| Conditional Expression | Fourth Example | Fifth Example | Sixth Example | Seventh Example | Eighth Example |
|---|---|---|---|---|---|
| fG1/f | 1.625 | 2.059 | 2.911 | 11.606 | 1.269 |
| fG2/f | 1.737 | 1.451 | 1.221 | 1.001 | 35.102 |
| fG1/fG2 | 0.936 | 1.419 | 2.385 | 11.594 | 0.036 |
| fG1/DPIP | 1.495 | 1.786 | 2.262 | 10.647 | 1.444 |
| fG2/DPIP | 1.597 | 1.259 | 0.948 | 0.918 | 39.945 |
| f/ImgH | 2.592 | 2.603 | 2.603 | 2.603 | 2.378 |
| TTL/f | 1.384 | 1.437 | 1.550 | 1.380 | 1.161 |
| LA1/PA1 | 1.468 | 1.354 | 1.453 | 1.290 | 1.682 |
| LA2/PA2 | 1.376 | 1.231 | 1.379 | 1.191 | 1.488 |
| LB1/PB1 | 0.645 | 0.701 | 0.793 | 0.785 | 1.041 |
| LB2/PB2 | 0.604 | 0.637 | 0.753 | 0.725 | 0.921 |
| (PA2 − PA1)/LA1 | 0.045 | 0.074 | 0.037 | 0.065 | 0.078 |
| (PB2 − PB1)/LB1 | 0.103 | 0.143 | 0.068 | 0.106 | 0.125 |

According to one or more embodiments, one or more examples, or combinations thereof described herein, the present disclosure may reduce a flare phenomenon caused by an optical path conversion means.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:

a first lens group, an optical path conversion element, and a second lens group arranged in order from an object side, wherein an optical axis of the second lens group is disposed eccentrically in a direction with respect to a geometric optical axis of the optical path conversion element, and wherein $1.0<TTL/f<1.6$, where f is a focal length of the imaging lens system and TTL is a distance from an object-side surface of a forwardmost lens, disposed closest to an object in the imaging lens system, to an imaging plane.

2. The imaging lens system of claim 1, wherein an optical axis of the first lens group is disposed eccentrically in a direction with respect to the geometric optical axis of the optical path conversion element.

3. The imaging lens system of claim 1, wherein the first lens group comprises a plurality of lenses.

4. The imaging lens system of claim 1, wherein in the first lens group, a front lens disposed closest to the optical path conversion element has positive refractive power.

5. The imaging lens system of claim 1, wherein in the first lens group, the forwardmost lens has a convex object-side surface.

6. The imaging lens system of claim 1, wherein the second lens group comprises a plurality of lenses.

7. The imaging lens system of claim 1, wherein in the second lens group, a rear lens disposed closest to the optical path conversion element has positive refractive power.

8. The imaging lens system of claim 1, wherein in the second lens group, a rearmost lens disposed closest to an imaging plane has positive refractive power or has a convex image-side surface.

9. The imaging lens system of claim 1, wherein $1.0<DPF/DPR$, where DPF is a distance of an optical path extending along a first optical axis of the first lens group from an object-side surface of the optical path conversion element to a reflective surface of the optical path conversion element, and DPR is a distance of an optical path extending along a second optical axis of the second lens group from the reflective surface of the optical path conversion element to an image-side surface of the optical path conversion element.

10. An imaging lens system, comprising a first lens group, an optical path conversion element, and a second lens group arranged in order from an object side, wherein $0.060<(PB2-PB1)/LB1<0.20$ and $1.0<TTL/f<1.6$, where PB1 is a shortest distance from a point in which an optical axis of the second lens group meets an exit surface of the optical path conversion element to one side of the exit surface, PB2 is a shortest distance from the point in which the optical axis of the second lens group meets the exit surface of the optical path conversion element to the other side of the exit surface, LB1 is an effective radius of an object-side surface of a rear lens disposed closest to the exit surface in the second lens group, f is a focal length of the imaging lens system, and TTL is a distance from an object-side surface of a forwardmost lens, disposed closest to an object in the imaging lens system, to an imaging plane.

11. The imaging lens system of claim 10, wherein in the first lens group, a front lens disposed closest to the optical path conversion element has positive refractive power.

12. The imaging lens system of claim 10, wherein in the first lens group, the forwardmost lens has a convex object-side surface.

13. The imaging lens system of claim 10, wherein the second lens group comprises a plurality of lenses.

14. The imaging lens system of claim 10, wherein in the second lens group, a rear lens disposed closest to the optical path conversion element has positive refractive power.

15. The imaging lens system of claim 10, wherein in the second lens group, a rearmost lens disposed closest to an imaging plane has positive refractive power or has a convex image-side surface.

16. The imaging lens system of claim 10, wherein $2.0<f/ImgH<3.60$, where ImgH is a height of an imaging plane.

17. An imaging lens system, comprising:

a first lens group, an optical path conversion element, and a second lens group arranged in order from an object side, wherein an optical axis of the second lens group intersects an optical axis of the first lens group on a reflective surface of the optical path conversion element spaced apart from a center of the reflective surface, and wherein $1.0<TTL/f<1.6$, where f is a focal length of the imaging lens system and TTL is a distance from an object-side surface of a forwardmost lens, disposed closest to an object in the imaging lens system, to an imaging plane.

18. The imaging lens system of claim 17, wherein the center is a geometric optical axis of the optical path conversion element.

19. The imaging lens system of claim 17, wherein the optical axis of the second lens group intersects the optical axis of the first lens group closer to the first lens group than the center is to the first lens group.

20. The imaging lens system of claim 17, wherein the optical axis of the second lens group intersects the optical axis of the first lens group further away from the first lens group than the center is from the first lens group.

* * * * *